May 17, 1966  H. KROBATH  3,252,084
MEASURING DEVICE USING IMPEDANCE VARIATION OF R.F. BRIDGE
COILS WITH TEMPERATURE COMPENSATION BY FLOWING
D.C. CURRENT THROUGH THE COILS
Filed April 24, 1961  3 Sheets-Sheet 1
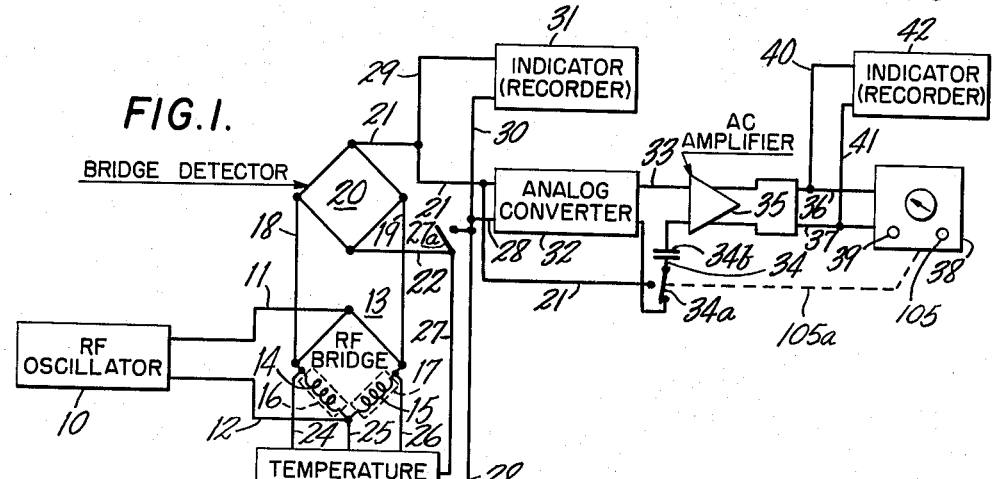
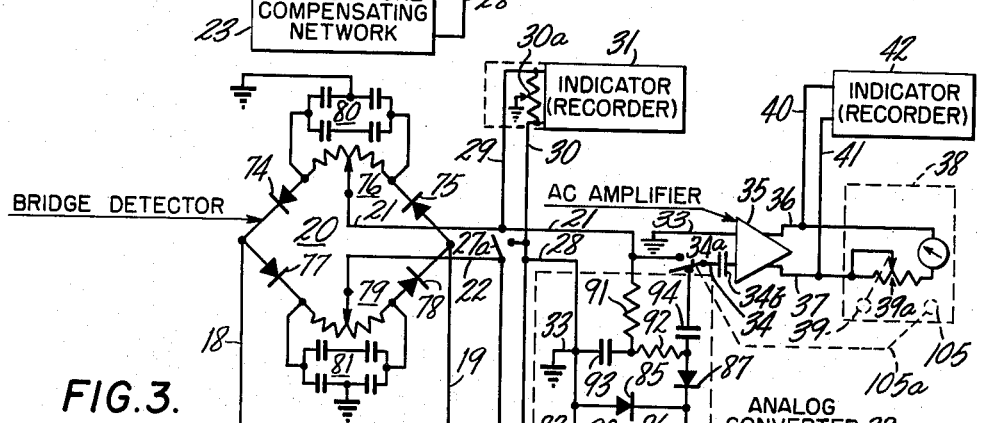
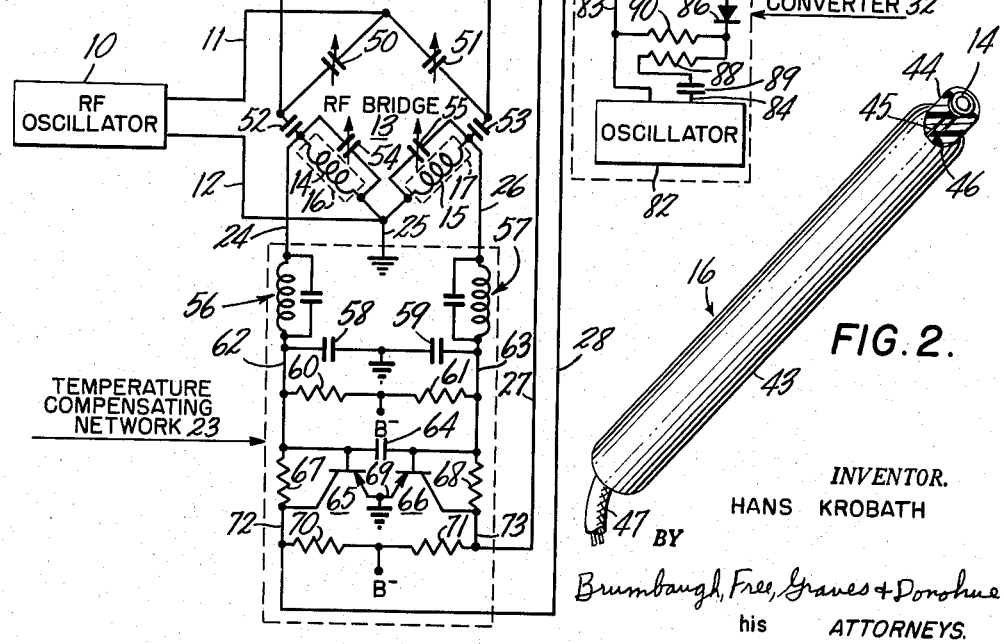
INVENTOR.
HANS KROBATH
BY
Brumbaugh, Free, Graves + Donohue
his ATTORNEYS.

May 17, 1966 H. KROBATH 3,252,084
MEASURING DEVICE USING IMPEDANCE VARIATION OF R.F. BRIDGE
COILS WITH TEMPERATURE COMPENSATION BY FLOWING
D.C. CURRENT THROUGH THE COILS
Filed April 24, 1961 3 Sheets-Sheet 2

INVENTOR.
HANS KROBATH
BY
Brumbaugh, Free, Graves + Donohue
his ATTORNEYS.

May 17, 1966  H. KROBATH  3,252,084
MEASURING DEVICE USING IMPEDANCE VARIATION OF R.F. BRIDGE
COILS WITH TEMPERATURE COMPENSATION BY FLOWING
D.C. CURRENT THROUGH THE COILS
Filed April 24, 1961  3 Sheets-Sheet 3

INVENTOR.
HANS KROBATH
BY
Brumbaugh, Free, Graves & Donohue
his ATTORNEYS

# United States Patent Office 3,252,084
Patented May 17, 1966

3,252,084
MEASURING DEVICE USING IMPEDANCE VARIATION OF R.F. BRIDGE COILS WITH TEMPERATURE COMPENSATION BY FLOWING D.C. CURRENT THROUGH THE COILS
Hans Krobath, Glen Cove, N.Y., assignor to Abilities, Inc., Albertson, N.Y., a corporation of New York
Filed Apr. 24, 1961, Ser. No. 105,159
4 Claims. (Cl. 324—40)

This invention relates to non-contacting measuring apparatus and, more particularly, to instruments using currents induced in conductive objects to measure minute dimensions and vibrations accurately.

Instruments devised to measure the distance from a fixed point to a conductive object, and to measure vibrations of an object, have suffered from deficiencies in sensitivity, linearity and accuracy. For example, to measure unbalance of rotating elements in motors and the like accurately, it has been necessary to provide a pickup device in physical contact with the vibrating element. It is impossible with these systems to measure distances and vibrations as small as several micro-inches in cutting precision parts by a machine tool, for example, or in measuring vibrations of high speed motor rotors.

Moreover, conventional measuring systems have several disadvantages resulting chiefly from the inability of known pickup devices, when attached to the vibrating structure, to generate signals having an amplitude proportional to displacement and independent of frequency. Since the output of such pickup devices varies with both the frequency and amplitude of vibration, their signals are difficult to interpret unless the instrument is calibrated to measure vibration at one low frequency only.

The present invention overcomes the above difficulties and provides an instrument that will measure minute dimensions, within a broad range starting at several micro-inches from a set point to a conductive body, and variations in distance from the set point to the body, with a high degree of accuracy over an extremely wide range of frequencies. To this end, a radio frequency energized coil has its electrical impedance varied in accordance with its proximity to conductive objects, and the resulting R.F. signals are utilized to provide information as to the distance of the objects from the coil and the amplitude of vibration of the objects.

In a preferred embodiment of the invention a pair of coils are positioned in a radio frequency bridge, at least one of the coils being adapted to be positioned at a set point in proximity to a conductive object. Currents induced in the object change the electrical impedance of the coil in accordance with its distance from the object to provide R.F. output signals indicative of the electrical impedance of the coil. Coupled to the R.F. bridge is a temperature compensating network that includes two coils, a necessity for any application of the instrument unless the coils are maintained in a temperature controlled oven or the like.

A detector coupled to the output of the R.F. bridge also responds to compensating signals from the temperature network to provide D.C. signals that are representative of the electrical impedance of the coils. Further circuits to receive these signals, depending on the particular information required, are provided to display directly the distance to an object or the vibration amplitude of the object.

In a preferred embodiment of the inventive instrument, an analog converter in the output of the detector enables accurate location of the probe or probes at a set position that provides a desired reference level of operation, thereby accurately calibrating the instrument.

These and further advantages of the invention will more readily be understood when the following description is read in conjunction with the accompanying drawings, in which:

FIGURE 1 is a schematic circuit diagram in block form of a measuring instrument embodying the principles of the present invention;

FIGURE 2 is a view in perspective of a probe used in the instrument shown in FIGURE 1;

FIGURE 3 is a schematic circuit diagram, partly in block form, of the instrument shown in FIGURE 1;

Figure 4:
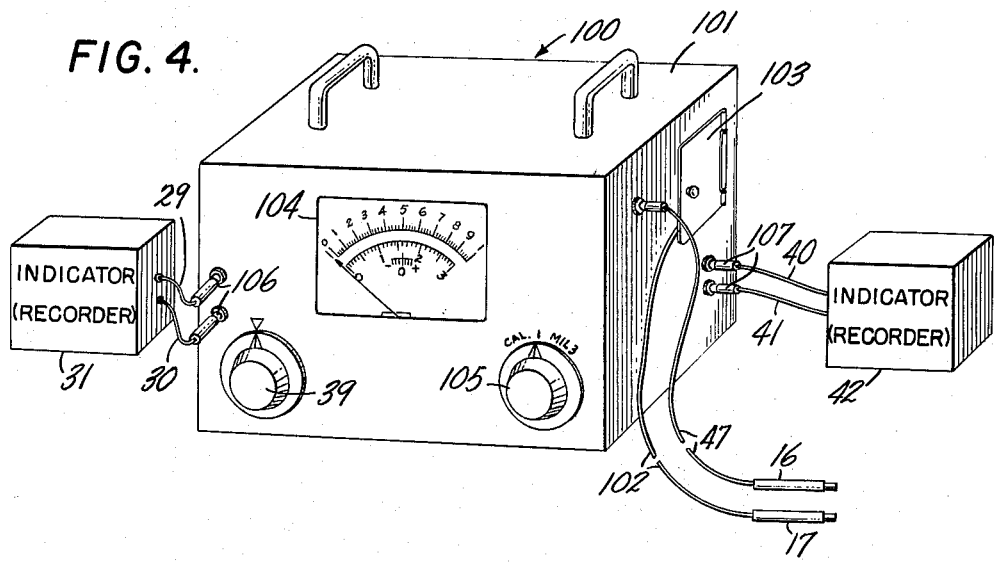
FIGURE 4 is a perspective view of a typical housing for the inventive instrument.

Referring to an exemplary measuring instrument in accordance with the invention in greater detail, in the block diagram of FIGURE 1 a radio frequency oscillator 10, preferably crystal controlled, supplies R.F. energy through conductors 11 and 12 to a diagrammatically illustrated radio frequency bridge 13. Two coils 14 and 15 are connected into adjacent arms of the R.F. bridge 13 with at least one of the coils located in a probe 16, shown in FIGURE 2, adapted to have its electrical impedance varied in accordance with its distance from conductive objects. In this embodiment of the invention, the other coil 15 is also held in probe 17 (FIGURE 4) identical to the probe 16.

Output signals from the bridge 13 are coupled through conductors 18 and 19 to a diagrammatically illustrated bridge detector 20 supplying direct current output signals across the conductors 21 and 22. If one or both of the coils 14 and 15 are positioned closely adjacent to a stationary conductive object, the D.C. output signals will have a constant amplitude. However, movement of the conductive object will result in the generation of modulated D.C. output signals from the bridge 20.

The coils 14 and 15 are also incorporated into a temperature compensating network 23 by conductors 24, 25 and 26. Output signals from the network 23 on conductors 27 and 28, representative of the resistance of the coils 14 and 15 and, therefore, representative of variations in their temperatures, are supplied to the bridge detector 20 through the conductors 27 and 22, so that a corrected D.C. signal is provided across the conductors 21 and 28. In the event uncompensated signals are required, a switch 27a across the conductors 27 and 28 may be closed to bypass the network 23.

Figure 9:
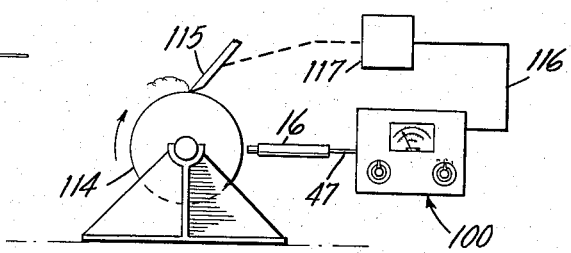

It is desirable in a particular application of the test instrument to display, record or use signals representative of the proximity of one or both of the coils 14 and 15 to a conductive object, conductors 29 and 30 are provide to couple the D.C. signals to an indicator 31 which may, if desired, include a suitable recorder and other control circuits referred to in greater detail in the discussion of FIGURE 9.

The D.C. signals on the conductors 21 and 28 are transformed by a high input impedance analog converter 32 to A.C. signals across the conductors 33 and 34, when switch 34a is operated as shown. Therefore, the amplitude of the A.C. signals impressed across the conductors 33 and 34 is a function of the magnitude of the D.C. input signals on the conductors 21 and 28.

When the switch 34a is operated to its other position, the analog converter 32 is bypassed and signals from the detector 20, modulated for example by a conductive object vibrating in proximity to the probe coil, are impressed directly across the conductors 33 and 34 and coupled through a capacitor 34b to a high input impedance A.C. amplifier 35.

The amplified signals, whether from the analog converter 32 or directly from the detector 20, are coupled through conductors 36 and 37 to a meter 38 that includes a control 39 that enables compensation for signal variations that occur between static and dynamic calibration, as more fully discussed hereinafter. A further control 105 on the meter 38 actuates the switch 34a through a suitable linkage 105a to switch the instrument from calibrate to read-out, and also to switch the instrument to a desired range.

Signals from the output of the A.C. amplifier 35 are also coupled, if desired, by conductors 40 and 41 to an indicator 42 which may include an oscilloscope to display the output and an appropriate recorder to provide a continuous record.

Examining an exemplary probe used to house the small probe coil 14, with reference to FIGURE 2, the probe 16 includes a relatively small diameter cylindrical casing 43, for example .5 inch in diameter, from which extends a plastic tip 44. The casing 43 may be threaded (not shown) to facilitate location of the coil 14 at set distance from a conductive object, or it may be of any other suitable configuration.

One exemplary coil 14, embedded in the plastic tip 44, was formed from 200 turns of 38 gauge silver wire, the unit having a nominal D.C. resistance of 40 ohms. The resistance of that particular coil varies between about 30 and 70 ohms within human environment temperatures and triples at temperatures on the order of 1,000° F. The coil 14 may, for example, be wound in doughnut form with an outer diameter of about .2 inch and an inner diameter of about .05 inch, the coil also being about .05 inch thick. Leads 45 and 46 extend from the coil 14 through the casing 43 to suitable conductors in a cable 47 connecting the probe 16 to the test instrument.

With respect to operation of the probe, energizing the coil 14 with high frequency energy and disposing it in proximity to a conductive object induces eddy currents in the object. The eddy currents set up a magnetic field that opposes the magnetic field of the inducing current in the coil 14 and thereby varies the electrical impedance of the coil 14. Stated in other words, a certain impedance is reflected to the coil 14 from the conductive object depending upon the distance between the coil and the object.

Referring to FIGURE 3, which shows in detail circuits that may be used in the block diagram of FIGURE 1, ground represents the positive side of the circuit and B⁻ has been suitably indicated. The R.F. bridge 13 includes variable capacitors 50 and 51 in adjacent bridge arms, joined to the conductor 11, that are initially adjusted to provide equal currents to both sides of the bridge at a suitable input signal level. Capacitors 52 and 53, in series with the coils 14 and 15 in the other bridge arms that are connected to the grounded conductor 12, serve to isolate the D.C. bridge 20 from the temperature compensating network 23. Trimmer capacitors 54 and 55 across the coils 14 and 15 facilitate final tuning of the bridge 13 to the coils.

The conductors 24 and 26 lead from one side of the coils 14 and 15 to LC networks 56 and 57 tuned to parallel resonance at the frequency of the R.F. oscillator 10, which may be on the order of 500 kilocycles and crystal controlled, to block R.F. energy from the temperature compensating network 23. Capacitors 58 and 59 bypass to ground any R.F. energy not blocked by the tuned circuits 56 and 57.

The midpoint of a pair of resistors 60 and 61 is joined to B⁻ to form, via conductors 62 and 63, the coils 14 and 15 and the conductor 25, a balanced D.C. voltage dividing network. A further R.F. bypass capacitor 64 also is connected across conductors 62 and 63.

Variations in voltage between the conductor 62 and ground, and the conductor 63 and ground, are respectively supplied to the base electrodes of conventionally connected transistors 65 and 66. Resistors 67 and 68 join the collector and base electrodes, and the emitter electrodes are connected to ground by a common conductor 69. Operating potentials are supplied to the transistors 65 and 66 from the B⁻ supply at the midpoint of further resistors 70 and 71 having their other ends joined to the transistor collector electrodes through conductors 72 and 73, respectively.

Considering the operation of the temperature compensating network 23, when the coils 14 and 15 have equal resistance; i.e., are at the same temperature, the circuits will be balanced throughout and there will be no output signal on the conductors 27 and 28, connected to the transistor outputs through conductors 72 and 73. Assuming that the coil 14 becomes heated and increases in resistance with respect to the coil 15, the circuits then are unbalanced and the conductor 62 becomes more negative and the conductor 63 becomes relatively more positive. Amplification of these differences by the transistors 65 and 66 results in a temperature correction or compensating signal across the output conductors 27 and 28.

Examining next the R.F. bridge 13, when the coil 14, for example, is energized and brought into proximity with a conductive object, the eddy currents induced in the object by the high frequency coil field generate a magnetic field that opposes current flow in the coil. The resulting change in coil impedance unbalances the R.F. bridge 13 and corresponding output signals are provided across the conductors 18 and 19.

The bridge detector 20, preferred as a detector by reason of its stability, voltage doubling feature, and high impedance to provide good linearity, rectifies the R.F. output signals across the conductors 18 and 19 and provides D.C. signals on the conductors 21 and 22. In particular, diodes 74 and 75, connected by the resistive element of a potentiometer 76, rectify the signals when the conductor 19 is positive with respect to the conductor 18, and diodes 77 and 78, joined by the resistive element of a potentiometer 79, rectify the signals when the conductor 18 is positive with respect to the conductor 19. Grounded filter networks 80 and 81 respectively connected across the potentiometers 76 and 79 provide a ripple free output signal.

The movable contacts of the potentiometers 76 and 79 are connected to the conductors 21 and 22, thereby providing D.C. output signals. The output conductor 27 of the temperature compensating network 23 supplies a D.C. signal to the detector 20 through the conductor 22 to provide a corrected output signal between the conductors 21 and 28.

Considering the operation of the bridge detector 20, initially the bridge is adjusted by means of the potentiometers 76 and 79 to provide a correct impedance load level to the analog converter 32 and the A.C. amplifier 35, which preferably have similar input impedances. Signals supplied to the bridge 20 on the conductors 18 and 19 are detected by the diodes 74, 75 and 77, 78, smoothed by the filter networks 80 and 81, and the resulting D.C. output signals, compensated by any temperature correcting signals furnished on the conductors 27 and 28, will appear across the conductors 21 and 28. The output signals may be displayed by the indicator 31, shown with a level setting potentiometer 30a in its input and, further, the signals may be recorded on any suitable recording mechanism associated with the indicator. The signals may also be used to actuate control devices, as discussed below in connection with FIGURE 9.

To calibrate the instrument by positioning one or both of the probes a selected distance from an object, thereby providing a reference level for making measurements with the inventive test instrument, the D.C. output signals from the bridge 20 are transformed to corresponding A.C. signals by the analog converter 32. Specifically, the converter 32 includes a sine wave oscillator 82 operating at a frequency on the order of 4 kilocycles per second provided by a multivibrator having its output shaped by a tuitable RC network, for example. Output conductors 83 and 84 supply the oscillator signals to a diode network including series connected diodes 85 and 86, and a further diode 87 connected to the common junction of the diodes 85 and 86. The circuit also includes a resistor 88 and a blocking capacitor 89. Another resistor 90 connects the conductor 83 to the upper end of the resistor 88.

Resistors 91 and 92 couple potentials on the conductor 21 to the diode 87. The characteristics of the converter 32 enable the use of a high value resistor 91, for example 1 megohm, in the input of the converter 32. A capacitor 93 bypasses the junction of the resistors 91 and 92 to the grounded conductor 33. Signals from the diode 87 are shaped by a capacitor 94 and the resistor 92 to a sine wave and supplied across output conductors 33 and 34 with the switch 34a positioned as shown.

In operation, the diode network in the analog converter 32 acts as a gate to provide A.C. signals across the output conductors 33 and 34 proportional to the magnitude of the D.C. potentials across the conductors 21 and 28. Thus, when the conductor 21 is highly positive with respect to the conductor 28, the diode 87 is open to conduct during a substantial portion of the A.C. signal impressed across the diodes 85, 86 and the resistor 88, by the oscillator 82, thereby providing a high amplitude A.C. output signal across the conductors 33 and 34 in the form of a sine wave. On the other hand, when the output conductor 21 is less positive with respect to the conductor 28, the diode 87 conducts only during the peaks of the signal impressed across the diodes by the oscillator 82, thereby resulting in low amplitude A.C. output signals across the output conductors 33 and 34.

An important feature of the analog converter 32 resides in its high input resistance, which is preferably equal to the input resistance of the A.C. amplifier 35, so that the probe coil circuits are never loaded to any appreciable extent. With this arrangement, it is possible to generate output signals that bear almost a linear relationship to the distance of the probe coils from conductive objects. Further, the converter obviates the use of D.C. amplifiers and mechanical choppers which would interfere seriously with the sensitivity and accuracy of the inventive circuits.

The A.C. amplifier 35 couples signals from the converter 32 to the output conductors 36 and 37 for use in the A.C. meter 38 with the switch 34a in the position shown. With the switch 34a in its other position, the analog converter 32 is bypassed and signals from the bridge 20 are applied directly to the input capacitor 34b of the A.C. amplifier 35. Of course a constant D.C. signal will not be coupled to the meter 38. However, with the instrument being used for dynamic measurements, the probe coil will be proximate to a vibrating conductive object, for example, and the A.C. component of the D.C. output signal will be amplified and supplied to the meter 38. The control 39 on the meter 38 adjusts a potentiometer 39a in series with the meter to compensate for deviations in the reference level due, for example, to setting the probe coil adjacent to a low or high point on the conductive body and the slight nonlinearity in the characteristics of the instrument, as explained in greater detail in connection with FIGURE 10.

The further indicator 42, such as an oscilloscope, may also be connected to display signals from the A.C. amplifier 35 and to record them permanently, if desired.

Examining FIGURE 4, which shows a test instrument 100 embodying the principles of the invention, a suitable housing 101 carries a chassis holding the circuits of FIGURE 3. The probe 16 is joined by its cable 47 to the interior of the housing 101 while the probe 17 is joined by its cable 102 to the circuits in the housing.

A compartment in the housing 101, accessible through a door 103, incorporates a clip (not shown) to hold the probe 17 and its cable 102 when only the single probe 16 is to be used.

The measuring instrument also includes a calibrated meter 104 and the sensitivity control 39 to enable an operator to calibrate the instrument dynamically after locating the probe at a selected distance from the object under test. The further control 105 actuates the switch 34a to the position shown in FIGURE 4 when set to "Calibrate" position, and to its other position when set to its "1 Mil" or "3 Mil" position.

Suitable jacks 106 and 107 are respectively provided in the housing 101 to facilitate connection of the indicators 31 and 42 to the test circuits when desired.

Figure 5:
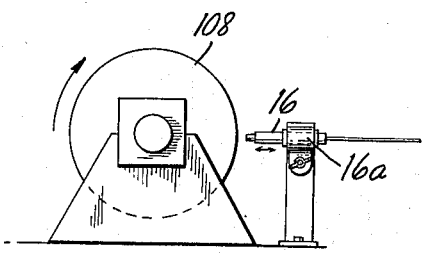
FIGURES 5 to 9 illustrate typical uses of a measuring or test instrument constructed in accordance with the principles of the present invention.

In a typical operation of the test instrument shown in FIGURES 1 to 4, the probe 17 is clipped into its compartment and the probe 16 fastened at a set position by a bracket 16a about .100 inch, the selected distance in this instance, from a suitably supported rotatable disc 108 that requires balancing, shown in FIGURE 5. Note that the distance of the probe 16 from the conductive objects in FIGURES 5 to 9 has been exaggerated in the interests of clarity. With the switch 105 at "Calibrate" and the analog converter 32 in circuit, the probe 16 is moved in the bracket 16a with respect to the stationary disc 108 to provide a zero setting at the center of the lower scale on the meter 104. With the probe coil 14 at a set position .100 inch from the disc 108, operation at point a on the curve of FIGURE 10 will be obtained.

Following initiation of disc rotation, any deviation of the meter 104 from the center zero is corrected by varying the sensitivity of the meter 38 through adjustment of the potentiometer 39a from its center position. Deviation of the signals supplied to the meter 38 from their static level may occur if the probe 16 was initially set adjacent to a high or low spot on the disc 108. Further, the slight nonlinearity of the characteristic shown in FIGURE 10 may provide a small deviation, dependent upon the magnitude of disc vibration. With a suitable characteristic, vibrations which will cause full scale readings on the meter may result in a total deviation of 10 percent from static to dynamic operation which can readily be corrected by adjustment of the potentiometer 39a.

Figure 10:
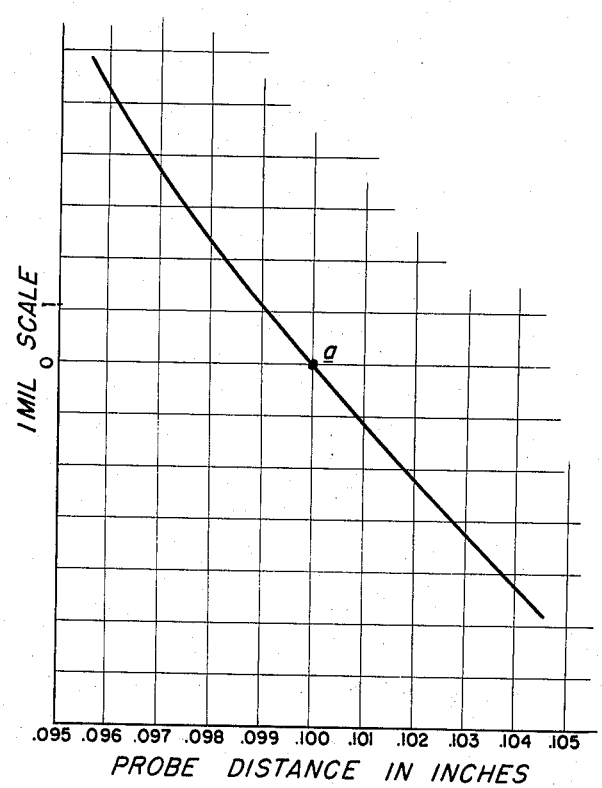
FIGURES 10 and 11 are curves helpful in explaining the principles of operation of the inventive test instrument.

After positioning the probe 16 at a set distance from the disc to provide a reference level insuring operation on a substantially linear characteristic, shown in FIGURE 10, the switch control 105 is rotated from "Calibrate" to the "1 Mil" scale or range. If the meter 104 goes off scale, indicating that the amplitude of vibration is greater than .001 inch, the switch 105 is rotated to the "3 Mil" scale, or to any other scale that may be provided on the instrument 100.

Vibration of the disc 108 causes it to move periodically with respect to the probe 16 to provide output signals from the R.F. bridge 13 and a modulated D.C. output signal from the detector 20. If the temperature of the probe coil 14 has increased, thereby increasing its resistance, correction signals from the network 23 are also supplied to the detector 20, and the resultant signals are applied to the input capacitor 34b of the A.C. amplifier 35. The vibration amplitude of the disc 108 is then read directly on the meter 104 in mils. With the control 105 set to the 1 mil range, .001 inch vibration of the disc 108 will cause full scale displacement of the meter 104.

Referring to FIGURE 10, the probe distance in inches has been plotted against the "1 Mil" scale to indicate the substantially linear characteristic of the instrument. Note that a vibration of 1 mil by the disc 108, with the set position at point a on the characteristic, provides a full scale reading on the "1 Mil" scale of the meter 104.

The output jacks 107 may also be used to supply signals to the indicator 42, which may be an oscilloscope, and the signals may also be recorded. Further, the electronic protractor disclosed in my copending application Serial No. 711,678, filed January 28, 1958, now U.S. Patent No. 3,039,312, may be combined with the present system to locate the angular position of any unbalance causing vibration of the rotating disc 108.

Figure 6:
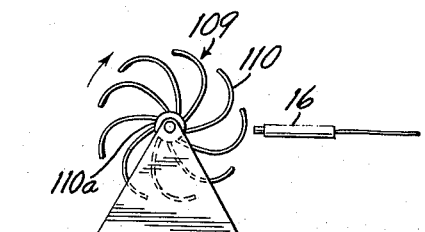

Referring to FIGURE 6 to describe another application of the inventive instrument, a rotating element 109 includes a number of radial blades 110 extending from a hub 110a. To determine whether the blades have the same radius within a specified small tolerance, the probe 16 is positioned adjacent to one of the blades 110 while it is at rest, the indicator 42, in this instance an oscilloscope, plugged into the output jacks 107, and the reference level set with the control 105 at "Calibrate," as discussed above. Following switching to a suitable scale, such as "1 Mil," the rotating blades 110 generate signals that provide a series of pips on the oscilloscope screen which should be of equal amplitude. Any pips of lesser or greater amplitude indicate a defective blade 110. Extremely high speed measurements of this nature may readily be made by the inventive instrument. For example, the instrument described may operate over the range from 1 to 200,000 dimensional variations per second.

Examining another advantageous application of the invention in which both probes 16 and 17 are used, a vibrating conductive object 111, shown here as a rod but which may be any member subject to movement or vibration, is positioned with two surfaces equidistant from the probes 16 and 17 preferably mounted a predetermined distance apart in a frame (not shown). Following calibration and balancing by means of the potentiometers 76, 79 and 30a, to center the indicator 31 on zero, movement of the rod in a plane passing through both probes will affect both probes and provide a differential output signal to the indicator 31 which may include a strip recorder, an oscilloscope, or any other desired indicator.

Figure 7:
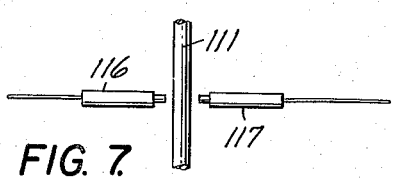
Figure 11:
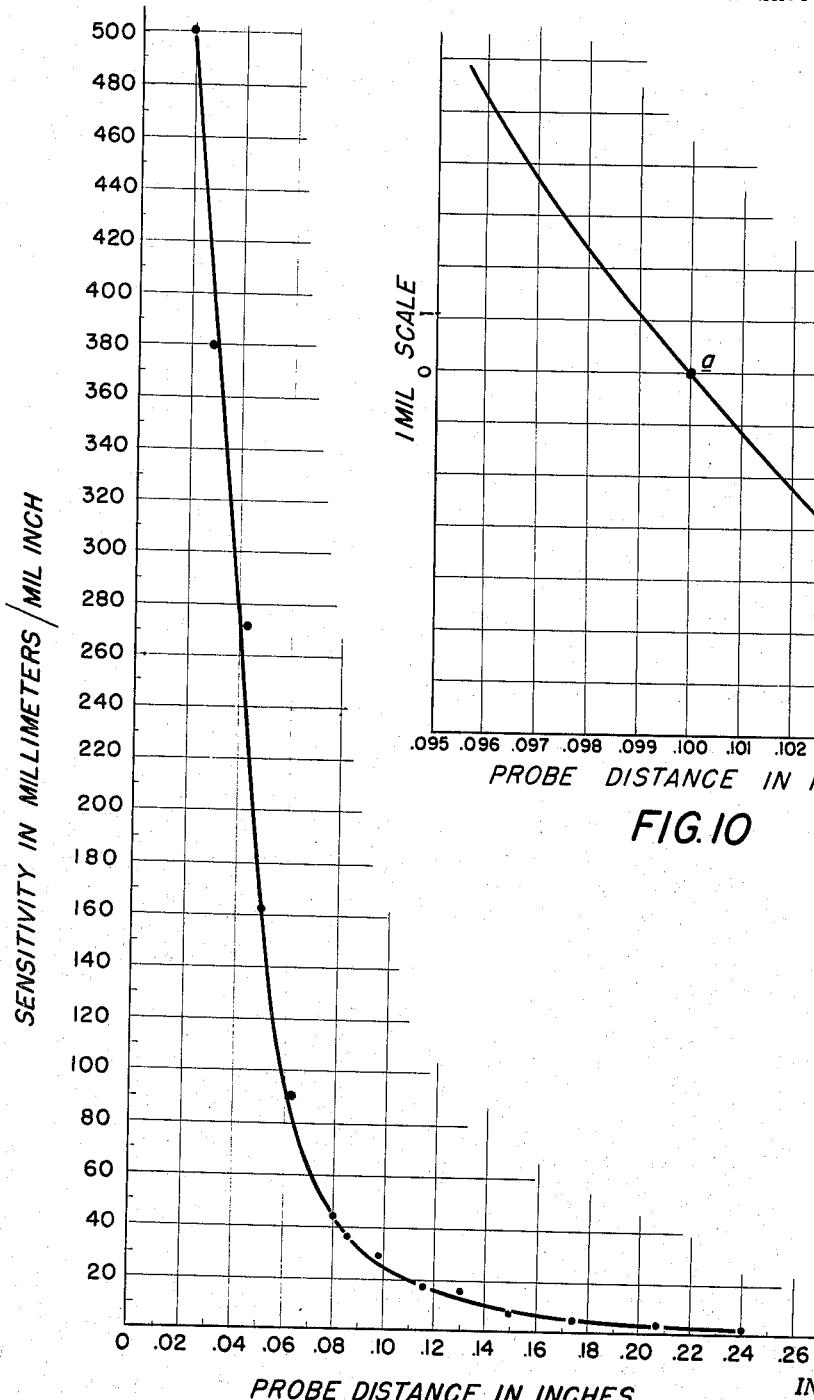

The sensitivity of an exemplary instrument used to measure movement of the rod 111 in FIGURE 7 is indicated in the characteristic shown in FIGURE 11. Thus, assuming that at a reference level the rod 111 is .100 inch from each of the probes 16 and 17, the instrument will have a sensitivity of about 23 millimeters per thousandths of an inch movement, the millimeters referring to the deviation of a stylus on a continuous strip recording in the indicator 31. In the event smaller deviations are to be measured, the probes 16 and 17 are located closer to the object, for example, .020 inch, to obtain a sensitivity of 500 millimeters displacement of the stylus across the strip recording for each .001 inch deviation of the object. Note that these sensitivities are obtained using the differential feature of the invention; i.e., as the conductive object approaches one probe coil it recedes from the other to provide greater sensitivity and higher output.

Figure 8:
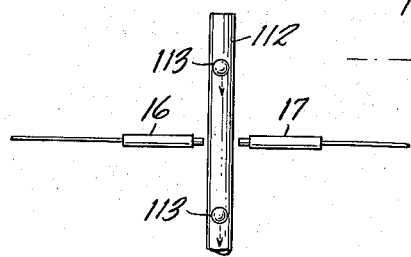

Referring next to FIGURE 8, for another use of the test instrument, a glass tube 112, through which metal ball bearings 113 are passed, is located equidistant from the probes 16 and 17. With a standard size ball bearing 113 between the probes 16 and 17, the indicator 31, plugged into the jacks 106, is set at center zero by means of the potentiometer 30a. Further, the arm of potentiometer 76 is moved to its extreme right hand position while the arm of the potentiometer 79 is moved to its extreme left hand position. Alternatively, the diodes 74 and 77 (or 75 and 78) are reversed in polarity. Production ball bearings are then passed through the glass tube 62 and a strip recording made of the signals from the bridge 20 in the indicator 31. Any ball bearings that are oversized or undersized may be spotted immediately from the strip record and eliminated. Further, an output signal below a predetermined threshold may operate a solenoid to remove an undersized ball bearing automatically while an output signal above a predetermined threshold may operate a solenoid to remove an oversized ball bearing automatically.

Referring to FIGURE 9, a cylindrical body 114 is being machined to a high tolerance by a tool 115. The probe 16 is positioned close to the rotating element 114 near the end of the machining process. The diminishing signal provided by the instrument 100 on the output conductors 21 and 28 is coupled by a cable 116 to a control device 117 that automatically disengages the tool 115 when the signal falls below a predetermined threshold.

The foregoing exemplary applications of the inventive test or measuring instrument are not to be considered as limiting the invention but have been set forth to show the wide scope of use for the invention in measurements of distances as low as a few micro-inches. Many further applications have been and will be developed for the instrument due to its reliability, independence of temperature, and accuracy. For example, the probes 16 and 17 have been operated at temperatures of 1,000° F. making them applicable to measurements of rotating jet engine components.

An induced current instrument has been provided that measures accurately the distances from probes to conductive objects and variations in distance. It will be understood that the above-described embodiments of the invention are illustrative only and modifications will occur to those skilled in the art. Therefore, the invention is not to be limited to the specific apparatus disclosed herein but is to be defined by the appended claims.

I claim:

1. Measuring apparatus comprising an R.F. bridge energized by a source of radio frequency energy, two coil circuits forming two legs of the bridge, means connected to the bridge to provide output signals in accordance with variations in the electrical impedance of the coil circuits, a temperature compensating network including the two coil circuits to generate compensating signals representative of variations in the resistance of the coil circuits resulting from their temperature changes, said temperature compensating network including means to flow D.C. current through the coil circuits, means to isolate portions of the temperature compensating network from the R.F. signals, and detector means responsive to the output signals of the R.F. bridge and to the compensating signals to generate signals representative of the electrical impedance of the coil circuits.

2. Induced current measuring apparatus comprising two coils, an R.F. bridge energized by a source of radio frequency energy, means connecting one coil in one arm of the R.F. bridge, means connecting the other coil in an adjacent arm of the R.F. bridge, the common junction of the coils being connected to the source of radio frequency energy to provide output signals in accordance with variations in the electrical impedance of the coils, at least one of the coils adapted to be positioned close to objects to have its electrical impedance varied in accordance with its distance from the objects, a temperature compensating network including the coils to generate compensating signals representative of variations in resistance of the coils resulting from their temperature changes, said network including means to flow D.C. current through the coils, means to isolate portions of the network from the R.F. signals, and detector means responsive to the output signals from the R.F. bridge and the temperature compensating network to generate signals representative of the electrical impedance of the coils.

3. Apparatus as defined in claim 2, which includes an analog converter responsive to the signals representative of the electrical impedance of the coils to generate A.C. signals having an amplitude indicative of the signals representative of the electrical impedance of the coils to enable positioning of at least one of the coils a selected distance from the objects to provide a reference level of operation.

4. Apparatus as defined in claim 2, in which the one coil is adapted to be placed in close proximity to the objects to provide signals varying substantially linearly with the distance of the one coil to the objects, and positioning the other coil at a fixed remote location with respect to the objects.

References Cited by the Examiner

UNITED STATES PATENTS

| | | | |
|---|---|---|---|
| 2,414,317 | 1/1947 | Middel | 307—88.5 |
| 2,782,365 | 2/1957 | Castel | 324—34 |
| 2,796,756 | 6/1957 | Yates | 324—34 X |
| 3,085,193 | 4/1963 | Perino | 323—69 |

OTHER REFERENCES

Kuehni, H. P.: Electric Gages, General Electric Review, vol. 45, No. 9, September 1942.

WALTER L. CARLSON, *Primary Examiner.*

FREDERICK M. STRADER, *Examiner.*

R. B. LAPIN, R. J. CORCORAN, *Assistant Examiners.*